May 9, 1933.　　　　H. H. JOHNSTON　　　　1,907,974
CONTROL SYSTEM
Filed July 17, 1931
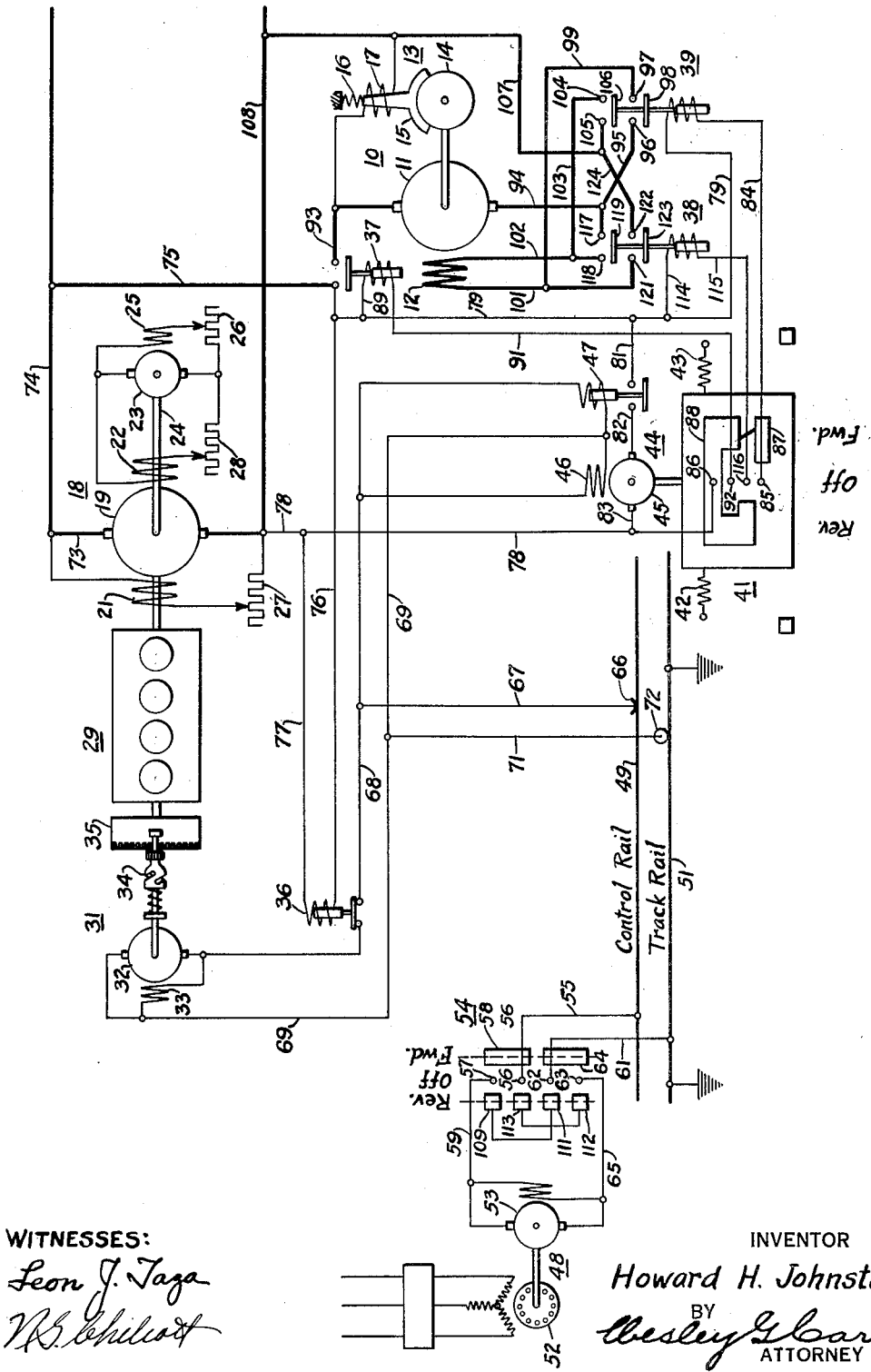
WITNESSES:
Leon J. Jaza
N.S. Chilcott
INVENTOR
Howard H. Johnston
BY
Wesley G. Carr
ATTORNEY Patented May 9, 1933

1,907,974

UNITED STATES PATENT OFFICE

HOWARD H. JOHNSTON, OF EDGEWOOD, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed July 17, 1931. Serial No. 551,387.

My invention relates, generally, to control systems, and more particularly, to systems for controlling the operation of gas-electric vehicles.

In my Patent #1,412,528, issued April 11, 1922, and assigned to the Westinghouse Electric & Manufacturing Company, is disclosed a control system for remotely controlling a vehicle, propelled by electric motors, from a tower or control room located along the track. The remote control of locomotives or cars is particularly useful in connection with the loading of cars from overhead bins, as an operator may be stationed in a control tower, located near the loading apparatus, from which an unobstructed view may be had. In this manner, the cars may be readily "spotted" under the loading chute by the operator in the control tower.

Gas-electric locomotives have certain advantages over electric locomotives for switching operations, and the utilization of gas-electric, in place of electric, locomotives makes the provision of a system for remotely controlling their operation desirable.

The object of my invention, generally stated, is to provide a control system for remotely controlling a gas-electric vehicle which shall be simple and efficient in operation and which may be economically manufactured and installed.

A more specific object of my invention is to provide for controlling the operation of a gas-electric locomotive from a remote control station by means of a single control rail extending from the control station to the locomotive.

Other objects of my invention will be explained fully hereinafter or will be apparent to those skilled in the art.

According to my invention, a gas-electric locomotive may be completely controlled by an operator in a control station or tower, which may be located at any convenient point along the track. The movement of the locomotive is controlled by switching apparatus located on the locomotive which is controlled by operating a control switch in the control tower. Control energy for actuating the switching apparatus is transmitted from the control tower to the locomotive through a single control rail and the running or track rails.

For a fuller understanding of the nature and scope of my invention, reference may be had to the following detailed description, taken in conjunction with the accompanying drawing, which is a diagrammatic view of a control system organized in accordance with my invention.

Referring to the drawing, 10 designates generally a motor which may be of a type suitable for propelling an electric vehicle. In this instance, the motor 10 is of the series type having an armature winding 11 and a field winding 12 disposed to be connected in series with the armature winding 11.

An electromagnetic brake 13, comprising a drum 14 and a brake shoe 15, is provided for retarding the movement of the vehicle. The shoe 15 is actuated into engagement with the drum 14 by a spring 16 and is released by a solenoid coil 17. Although an electromagnetic brake is illustrated, it will be understood that a brake mechanism of another type, such as the well known air brake, may be utilized, if desired.

Power for operating the motor 10 is supplied by a generator 18 having an armature winding 19 and a self-excited shunt field winding 21. As is customary on gas-electric vehicles, the generator 18 is also provided with an additional field winding 22 which is excited by an exciter 23 that is mechanically connected to the generator 18 by a shaft 24. The exciter 23 is provided with a self-excited field winding 25. The voltage of the exciter 23 may be adjusted by means of a variable rheostat 26, and the voltage of the generator 18 may be regulated by rheostats 27 and 28, which are provided in the circuits of the field windings 21 and 22, respectively.

The generator 18 is driven by a motor 29, which may be of the internal-combustion type. A starting motor 31, having an armature 32 and a field winding 33, is provided for cranking the motor 29. The motor 31 is connected to the engine 29 by means of a starting mechanism 34, which is disposed to engage the fly wheel 35 of the engine 29.

The starting mechanism 34 may be of the type disclosed in Patent No. 1,513,244, issued to C. H. Hodgkins et al. or it may be of the well known "Bendix" type. As the operation of starting mechanisms of this type is well known, it will not be described in detail in this application. The energization of the starting motor 31 is controlled by a starting switch 36, the functioning of which will be explained more fully hereinafter.

An electrically-operated line switch 37 is provided for connecting the motor 10 to the generator 18 to energize the motor. In order that the direction of rotation of the motor 10 may be reversed to reverse the locomotive, electrically-operated reversing switches 38 and 39 are so connected in the motor circuit that the direction of the current through the field winding 12 may be reversed, when the one or the other of these switches is closed.

The operation of the reversing switches 38 and 39 is controlled by a motor-operated control switch 41 which may be of the well known drum type. As shown, the switch 41 is normally retained in the "off" position by suitable springs 42 and 43 but may be actuated to either the "forward" or the "reverse" position by a torque motor 44, having an armature 45 and a field winding 46.

It will be readily understood that the direction of rotation of the motor 44 may be controlled by reversing the current in the field winding 46. In this manner, the switch 41 may be actuated in either direction. An electrically-operated switch 47 is provided for connecting the armature 45 of motor 44 to the generator 18.

In order that the operation of the locomotive may be controlled from a remote tower or station, a motor-generator set 48 is disposed to be connected to the locomotive by means of a control rail 49 and the track rail 51. The motor-generator set 48 comprises an induction motor 52 and a direct-current generator 53. The stator winding of the motor 52 may be connected to a suitable source of alternating-current power. If preferred, a battery, or other reliable source of direct current, may be utilized in place of the motor-generator set 48 for supplying control energy for controlling the locomotive. A manually-operated control switch 54 is provided in the control station for remotely controlling the movement of the locomotive. As shown, the switch 54 may be actuated to either the "forward", the "reverse" or the "off" position by an operator stationed in the control tower.

In order that the functioning of the apparatus may be understood, the operation of the control system will now be described. Assuming that it is desired to remotely control the locomotive fom the control station and that the engine 29 is not running, the engine 29 may be cranked by actuating the switch 54 to either the "forward" or the "reverse" position, thereby connecting the control rail 49 to a terminal of the generator 53 and the track rail 51 to the other terminal. In the forward position the control rail 49 is connected to the positive terminal of the generator through conductor 55, contact fingers 56 and 57—bridged by contact segment 58— and conductor 59. The track rail 51 is connected to the negative terminal of the generator 53 through conductor 61, contact fingers 62 and 63—bridged by contact segment 64— and conductors 65.

Energizing the control rail 49 and the track rail 51 applies energy to the starting motor 31 through a circuit which extends from the control rail 49, through a contact shoe 66, carried by the locomotive, conductors 67 and 68, the switch 36, the armature winding 32 and the field winding 33 of the motor 31, conductors 69 and 71 and the wheel 72, to the track rail 51.

When the motor 31 starts rotating, it will be connected to the fly wheel 35 by the starting mechanism 34, thereby cranking the engine 29. As soon as the generator 18 starts rotating, a voltage is developed and the relay 36, which is connected across its terminals, is actuated to the open position, thereby interrupting the circuit through the starting motor 31. The circuit through the actuating coil of the relay 36 may be traced from one terminal of the armature 19, through conductors 73, 74, 75 and 76, the actuating coil of the relay 36 and conductors 77 and 78, to the other terminal of the armature 19. In this manner, the starting motor 31 is disconnected from the engine 29 as soon as the engine accelerates to a predetermined speed.

When the conductors 68 and 69 are energized, as previously described, by operating the control switch 54 in the control tower, both the field winding 46 of the torque motor 44 and the actuating coil of the switch 47 are energized. The switch 47 is thereby closed to connect the armature 45 of the torque motor 44 to the generator 18. The circuit through the armature 45 extends from one terminal of the generator 18, through conductors 73, 74, 75, 79 and 81, the switch 47, conductor 82, the armature 45 and conductors 83 and 78, to the other terminal of the generator 18.

Assuming that the armature winding 45 and the field winding 46 of the motor 44 are so connected that the motor 44 will rotate in a direction to actuate the switch 41 to the "forward" position when the conductor 68 is of a positive polarity and conductor 69 is of a negative polarity, the switch 41 is thereby actuated to the "forward" position upon the closing of the switch 47.

When the control switch 41 is actuated to the "forward" position, the reversing switch 39 is closed to connect the field winding 12 of the motor 10 in series with the armature 11.

The circuit through the actuating coil of the reversing switch 39 may be traced from the previously energized conductor 79, through the actuating coil of the switch 39, conductor 84, contact fingers 85 and 86—bridged by contact segments 87 and 88—and conductor 78, to the negative terminal of the generator 18.

The actuating coil of the line switch 37 is also connected across the generator 18 when the control switch 41 is actuated to the "forward" position, thereby causing the line switch 37 to connect the motor 10 to the generator 18. The circuit through the actuating coil of the line switch 37 extends from the previously energized conductor 79, through conductor 89, the actuating coil of the switch 37, conductor 91, contact fingers 92 and 86—bridged by the contact segment 88—and conductor 78, to the negative terminal of the generator 18.

In this manner, the motor 10 may be so connected to the generator 18 that it will be caused to propel the locomotive in a forward direction. The motor circuits, which are established by the closing of the reversing switch 39 and the line switch 37, may be traced from the positive terminal of the generator 18, through conductors 73, 74 and 75, the line switch 37, conductor 93, the armature 11, conductors 94 and 95, contact members 96 and 97—bridged by contact segment 98—conductors 99 and 101, the field winding 12, conductors 102 and 103, contact members 104 and 105—bridged by contact segment 106—and conductors 107, 108 and 78, to the negative terminal of the generator 18.

It will be readily understood that the brake-release coil 17 of the electromagnetic brake 13 is energized when the line switch 37 is closed, thereby releasing the brake shoe 15 from the drum 14 to permit the motor 10 to rotate freely.

If it is desired to stop the locomotive, the operator in the control station may actuate the control switch 54 to the "off" position, which disconnects the control rail 49 and the track rail 51 from the generator 53. Accordingly, the field winding 46 of the motor 44 and the actuating coil of the switch 47 are deenergized, thereby deenergizing the motor 44, which permits the drum switch 41 to be returned to the "off" position by the springs 42 and 43.

When the switch 41 is returned to the "off" position, the actuating coils of the line switch 37 and the reversing switch 39 are deenergized, thereby permitting the switches to open, which disconnects the motor 10 from the generator 18. Upon the opening of the line switch 37, the coil 17 of the brake 13 is deenergized, thereby permitting the spring 16 to apply the brake shoe 15 to the drum 14 to stop the locomotive.

The locomotive may be caused to move in the reverse direction by actuating the control switch 54 to the "reverse" position to reverse the polarity of the control rail 49 and track rail 51. When the control switch 54 is in the "reverse" position, the track rail 51 is connected to the positive terminal of the generator 53 through conductor 59, contact segments 109 and 111—engaged by contact fingers 57 and 62—and conductor 61. The control rail 49 is connected to the negative terminal of the generator 53 through conductor 65, contact segments 112 and 113—engaged by contact fingers 63 and 56—and conductor 55.

It will be understood that the reversing of the polarity of the control rail 49 and the track rail 51 reverses the polarity of the field winding 46 of the motor 44, thereby causing the motor to rotate in a direction to actuate the switch 41 to the "reverse" position when its armature 45 is connected to the generator 18, upon the closing of the switch 47. The actuating coil of the switch 47 is energized to close the switch simultaneously with the energizing of the field winding 46.

In this manner, the switch 41 may be actuated to the "reverse" position to close the reversing switch 38 and the line switch 37. The circuit for the actuating coil of the reversing switch 38 extends from the positive conductor 79, through conductor 114, the actuating coil of the switch 38, conductor 115, contact fingers 116 and 86—bridged by the contact segment 88—to the negative conductor 78. The circuit for the actuating coil of the line switch 37 may be traced from the positive conductor 79, through conductor 89, the actuating coil of the switch 37, conductor 91, contact fingers 92 and 86—bridged by the contact segment 88—to the negative conductor 78.

Accordingly, the armature 11 and field winding 12 of the motor 10 are so connected to the generator 18 that the motor 10 will rotate in the reverse direction, since the polarity of the field winding 12 is reversed with respect to the polarity of the armature 11. The motor circuit may now be traced from the positive conductor 75, through the line switch 37, conductor 93, the armature winding 11, conductor 94, contact members 117 and 118—bridged by contact segment 119—conductor 102, the field winding 12, conductor 101, contact members 121 and 122—bridged by contact segment 123—and conductors 124 and 107, to the negative conductor 108.

As previously explained, the locomotive may be stopped at any time by actuating the switch 54 to the "off" position, thereby causing the motor 10 to be disconnected from the generator 18, and the magnetic brake 13 to be applied.

If it is desired to control the locomotive from its cab, the control switch 54 in the control tower may be set in the "off" position and the locomotive controlled by manually operating the switch 41, which may be located in the locomotive cab. In this manner, the locomotive may be controlled by an operator in the cab, as is the usual practice.

It will be evident from the foregoing description that I have provided a system which enables an operator to control the movement of a gas-electric locomotive from a remote control station and is especially suitable for controlling gas-electric locomotives which are utilized in connection with the loading of cars from overhead bins. It will also be evident that the number of control conductors from the control station to the locomotive is reduced to a minimum, as only a single control rail is required, in addition to the track rails.

I do not desire to be restricted to the particular form or arrangement of parts herein shown and described, since it is evident that they may be changed and modified without departing from the spirit and scope of my invention, as defined in the appended claims.

I claim as my invention:

1. In a vehicle-control system, in combination, a propelling motor for the vehicle, a generator on the vehicle for supplying power to the motor, an engine on the vehicle for driving the generator, switching means on the vehicle for controlling the starting of the engine and the movement of the vehicle, a track rail for supporting the vehicle, a remote control station for controlling the switching means on the vehicle, and a control rail cooperative with the track rail to transmit control energy from the control station to the vehicle to actuate the switching means on the vehicle to control the movement of the vehicle.

2. In a vehicle-control system, in combination, a propelling motor for the vehicle, a generator on the vehicle for supplying power to the motor, an engine on the vehicle for driving the generator, switching means on the vehicle for controlling the starting of the engine and the direction of rotation of the motor, a track rail for supporting the vehicle, switching means in a remote control station for controlling the vehicle, and a control rail cooperative with the track rail to transmit control energy from the remote station to the vehicle to actuate the switching means on the vehicle to control the direction of movement of the vehicle.

3. In a vehicle-control system, in combination, a propelling motor for the vehicle, a generator on the vehicle for supplying power to the motor, an engine on the vehicle for driving the generator, switching means on the vehicle for controlling the motor and the engine, a track rail for supporting the vehicle, a remote control station for controlling the vehicle, a source of electrical energy in the control station, a control rail cooperative with the track rail to transmit control energy from the station to the vehicle, and switching means in the control station for connecting the source of electrical energy to the rails to actuate the switching means on the vehicle to control the movement of the vehicle.

4. In a vehicle-control system, in combination, a propelling motor for the vehicle, a generator on the vehicle for supplying power to the motor, an engine on the vehicle for driving the generator, electrically-operated switching means on the vehicle for controlling the motor and the engine, a track rail for supporting the vehicle, a remote control station for controlling the vehicle, a direct-current source of electrical energy in the station, a control rail cooperative with the track rail to transmit control energy from the station to the vehicle, and manually-operated switching means in the control station for controlling the polarity of the transmitted energy, whereby the switching means on the vehicle may be actuated to control the movement of the vehicle.

5. In a vehicle-control system, in combination, a propelling motor for the vehicle, a generator on the vehicle for supplying power to the motor, an engine on the vehicle for driving the generator, electrically-operated switches on the vehicle for controlling the starting of the engine and reversing the direction of rotation of the motor, means on the vehicle responsive to the polarity of an applied voltage for controlling the reversing switches, a source of direct-current electrical energy located in a remote control station, a track rail for supporting the vehicle, a control rail cooperative with the track rail to transmit control energy from the station to the vehicle, and manually-operated switching means in the control station for controlling the polarity of the transmitted energy, whereby the switching means on the vehicle may be actuated to control the movement of the vehicle.

6. In a vehicle-control system, in combination, a propelling motor for the vehicle, a generator on the vehicle for supplying power to the motor, an engine on the vehicle for driving the generator, electrically-operated means on the vehicle for starting the engine, connecting the motor to the generator and for reversing the direction of rotation of the motor, a control drum for controlling the operation of the electrically-operated means, means responsive to the polarity of an applied voltage for actuating the control drum, a source of direct-current electrical energy located in a remote control station, a control rail for transmitting control energy from the control station to the vehicle, a grounded return circuit for the control energy, and switching means in the control station for controlling the polarity of the transmitted energy, whereby the switching means on the vehicle may be actuated from the control station to control the movement of the vehicle.

7. In a vehicle-control system, in combination, a propelling motor for the vehicle, a generator on the vehicle for supplying power to the motor, an engine on the vehicle for driving the generator, means on the vehicle for starting the engine, switching means for applying power to the motor and for reversing the direction of rotation of the motor, braking means for stopping the vehicle, means responsive to the application of power to the motor for releasing the braking means, means responsive to the polarity of an applied voltage for controlling the switching means, a remote source of electrical energy for applying a voltage to the controlling means, means for transmitting the electrical energy from the remote source to the vehicle, and means for controlling the polarity of the transmitted energy, whereby the movement of the vehicle may be controlled from a remote station.

8. In a vehicle-control system, in combination, a propelling motor for the vehicle, a generator for supplying power to the motor, an engine for driving the generator, switching means for controlling the direction of rotation of the motor, a remote control station for controlling the actuation of the switching means, a control rail for transmitting electrical energy from the control station to the vehicle, switching means in the control station for controlling the energization of the control rail, and a starting motor responsive to the energization of the control rail for cranking the engine to cause the generator to develop a voltage.

9. In a vehicle-control system, in combination, a propelling motor for the vehicle, a generator for supplying power to the motor, an engine for driving the generator, switching means for controlling the direction of rotation of the motor, a remote control station for controlling the actuation of the switching means, a control rail for transmitting electrical energy from the control station to the vehicle, switching means in the control station for controlling the energization of the control rail, a starting motor responsive to the energization of the control rail for cranking the engine to cause the generator to develop a voltage, and a relay responsive to the voltage of the generator for disconnecting the starting motor from the control rail.

In testimony whereof, I have hereunto subscribed my name this 9th day of July, 1931.

HOWARD H. JOHNSTON.